US012450419B1

(12) United States Patent
Duan

(10) Patent No.: US 12,450,419 B1
(45) Date of Patent: Oct. 21, 2025

(54) AUTOMATIC DESIGN PARAMETER OPTIMIZATION FOR ELECTRONIC CIRCUIT DESIGNS WITH OPERATING ENVIRONMENT COVERAGE

(71) Applicant: Synopsys, Inc., Mountain View, CA (US)

(72) Inventor: Xiaopeng Duan, Austin, TX (US)

(73) Assignee: Synopsys, Inc., Sunnyvale, CA (US)

( * ) Notice: Subject to any disclaimer, the term of this patent is extended or adjusted under 35 U.S.C. 154(b) by 743 days.

(21) Appl. No.: 17/838,671

(22) Filed: Jun. 13, 2022

Related U.S. Application Data

(60) Provisional application No. 63/210,400, filed on Jun. 14, 2021.

(51) Int. Cl.
*G06F 30/398* (2020.01)
*G06F 30/27* (2020.01)
*G06F 119/02* (2020.01)

(52) U.S. Cl.
CPC ............ *G06F 30/398* (2020.01); *G06F 30/27* (2020.01); *G06F 2119/02* (2020.01)

(58) Field of Classification Search
CPC ..................................................... G06F 30/398
USPC ........................................................ 716/132
See application file for complete search history.

(56) References Cited

U.S. PATENT DOCUMENTS

2021/0318379 A1* 10/2021 Millican ............... G06F 30/337

OTHER PUBLICATIONS

Alarie, S. et al. "Two Decades of Blackbox Optimization Applications." EURO Journal on Computational Optimization, vol. 9, Sep. 18, 2021, pp. 1-13.
Cassioli, A. "A Tutorial on Black-Box Optimization." LIX—Ecole Polytechnique, PowerPoint Presentation, Apr. 25, 2013, 32 slides.
Sahinidis, N. "Black-Box Optimization and Machine Learning." Sahinidis Optimization Group, Georgia Institute of Technology, Nov. 3, 2020, 2 pages, [Online] [Retrieved Nov. 11, 2022], Retrieved from the Internet <URL:https://sahinidis.coe.gatech.edu/bbo>.

* cited by examiner

*Primary Examiner* — Eric D Lee
(74) *Attorney, Agent, or Firm* — Fenwick & West LLP

(57) ABSTRACT

A system performs optimization of parameters of a circuit design. The system accesses a model configured to receive design variables of the circuit design and predict a measure of quality of the circuit design. For multiple coverage levels, the system generates samples representing a values of design parameters. For each sample, the system predicts the quality of the sample using the model. The system selects a subset of samples having a predicted quality that exceeds a target. The system performs simulations of the selected subset of samples. The system maintains a moving target and drops samples encountering worse results before all simulations finish. The system performs incremental training of the model based on results of the simulations of the selected subset of samples. The system also decides whether to enter the next coverage level based on the simulation results and the moving target.

20 Claims, 7 Drawing Sheets

AUTOMATIC DESIGN PARAMETER OPTIMIZATION FOR ELECTRONIC CIRCUIT DESIGNS WITH OPERATING ENVIRONMENT COVERAGE

CROSS REFERENCE TO RELATED APPLICATIONS

This application claims a benefit of U.S. Patent Application Ser. No. 63/210,400, filed Jun. 14, 2021, the contents of which are incorporated by reference herein in its entirety.

TECHNICAL FIELD

This disclosure relates to design of electronic circuits in general and more specifically to automatic design parameter optimization with operating environment coverage.

BACKGROUND

A circuit design task involves evaluating properties of a circuit in a particular environment, for example, under certain operating conditions such as temperature ranges, power supply fluctuations, process variations, and so on. The properties may be extracted by performing circuit simulations and include noise level, signal delays, power gain, bandwidth, and so on. The circuit design task may be evaluated using simulation with multiple corners and Monte Carlo variations. Monte Carlo variations are used to handle fabrication process variations. For example, transistor sizes when fabricated may not match the designed values. The design should be able to tolerate such process variations. A design that satisfies all requirements in one environment setting may fail one or more requirements in another environment setting. For example, higher temperature makes it harder to reduce the noise level. Accordingly, a circuit design that has acceptable noise levels in certain temperature may have unacceptable noise levels at higher temperature environments. Accordingly, to obtain a circuit design that has acceptable properties under all environments requires evaluating the properties for several corners and Monte Carlo variations. The number of combinations of corners and Monte Carlo variations can be very high. Performing simulations for all these combinations is computationally very expensive. Manually analyzing the results of simulations and tuning the parameters makes the design process slow and expensive.

SUMMARY

A system performs optimization of parameters of a circuit design. The system receives requirements for a circuit design. The system accesses a model configured to receive design variables of the circuit design and predict a quality of the circuit design. For each of a plurality of coverages, the system performs following steps. The system generates a set of samples for the coverage level. Each sample represents a set of values of design parameters. For each sample from the set of samples, the system predicts the quality of the sample using the model. The system selects a subset of samples having a predicted quality that exceeds a target. The system performs simulations of the selected subset of samples. The system maintains a moving target and drops samples encountering worse results before all simulations finish. The system performs incremental training of the model based on results of the simulations of the selected subset of samples. Some of the samples are selected for the next coverage level based on results of the simulations and the moving target.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

A system implements an automatic design parameter optimization to improve the efficiency of execution of the circuit design process. Given a preliminary circuit design, the system automatically optimizes the design to satisfy a set of properties over a range of pre-defined environments. The properties may represent requirements for a circuit being designed. For example, the target circuit design may be required to have noise level below a threshold T1, signal delays below a threshold T2, bandwidth above a threshold T3, and so on. A circuit designer aims to design a circuit that satisfies these properties for various environments in which the circuit is expected to operate, for example, under certain range of temperature, driving voltage, and so on.

The system uses a surrogate model to assist the optimization process. A surrogate model represents a model that can make a prediction based on some input vectors. Examples of surrogate models include simple regression models (linear/nonlinear regression, Gaussian regression, supporting vector regression, and so on) as well as other supervised machine learning models. The surrogate model is incrementally trained using the simulation results across the environment variations as the optimization process correlates the behaviors across the environments together. The surrogate model is used to identify less promising cases and reduce the number of simulations needed to get the optimized design faster. The system further uses techniques described herein such as use of moving targets for determining threshold objectives, early dropping of samples, and coverage selection for improving performance of the process. As a result, the system manages the optimization across environment variations efficiently to reduce the simulations needed, thus reducing the turn around time and saving computing resources.

Figure 1:
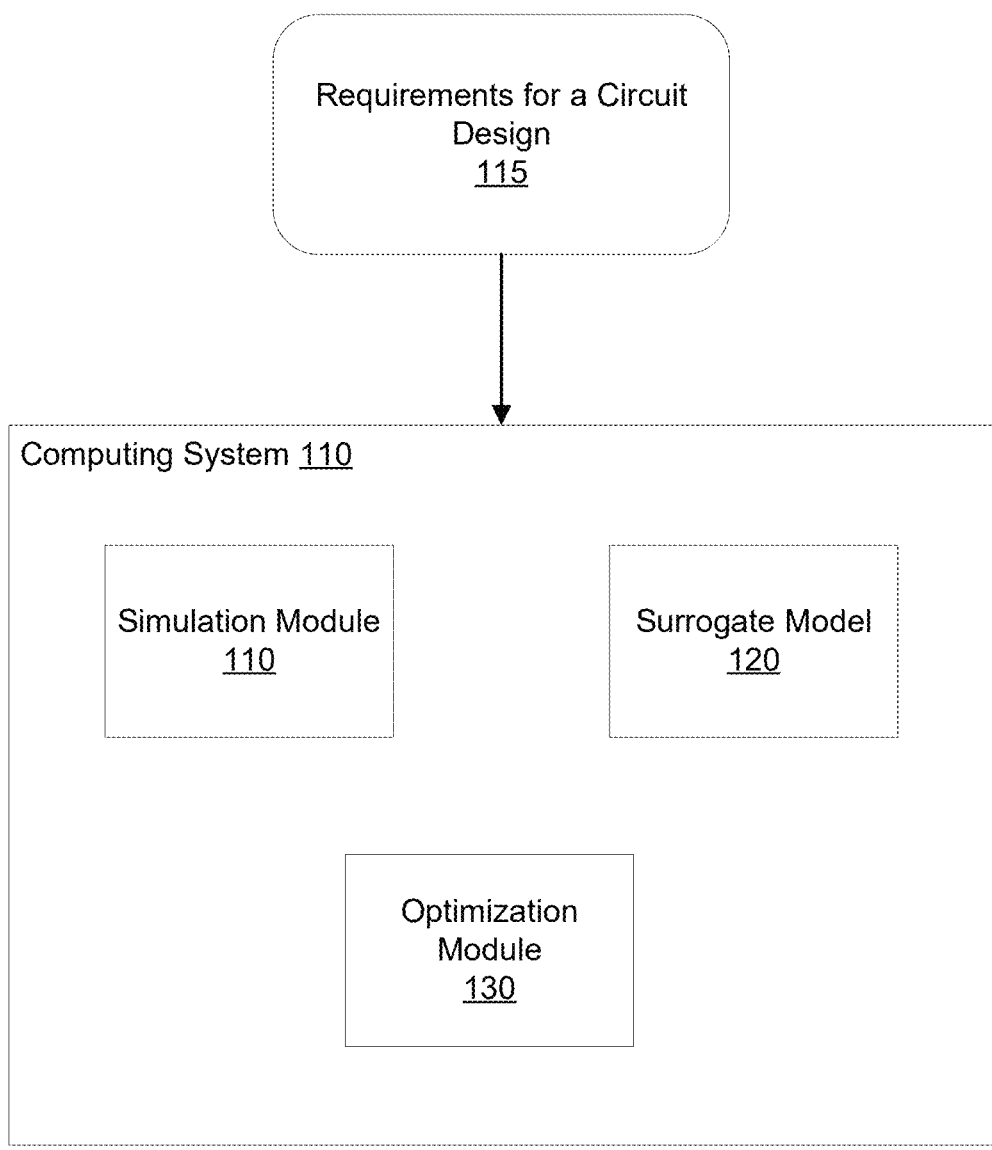
FIG. 1 illustrates the system environment for performing design parameter optimization for a circuit design according to an embodiment.

FIG. 1 illustrates the system environment for performing design parameter optimization for a circuit design according to an embodiment. The computing system 110 receives requirements for a circuit design 115 and performs the design parameter optimization. For example, the requirements may specify that a circuit design for an operational amplifier needs to be designed with specified properties (e.g., amplifier gain, bandwidth, noise level, delay and so on.). The computing system implements an optimization framework and includes a simulation module 110, a surrogate model 120, and an optimization module 130. Other embodiments may include more or fewer modules than indicated herein. Furthermore, modules may be combined such that steps described as being performed by a particular module herein may be performed by another module without deviating from the scope of the present disclosure. The modules of the circuit design analysis system 110 are implemented by one or more processing devices (also referred to as computer processors), for example, the processing device shown in FIG. 6.

The simulation module 110 simulates the circuit design, for example, for a set of environment variables. The simulation of the circuit is performed to determine whether a set of properties is satisfied. Examples of properties include noise level, signal delays, power gain, bandwidth, and so on. The system performs simulation to determine whether each property is within a threshold specified for that property. The surrogate model 120 allows quick evaluation of the circuit design for a set of environment variables without requiring a full simulation. According to an embodiment, the surrogate model 120 takes an input the parameters of the circuit design and outputs properties of the circuit design. For example, if the designer is tuning values of certain resistors and capacitors of the circuit design and the dimensions of certain transistors, the input to the surrogate model is a vector specifying values of the resistors and capacitors and the dimensions of the transistors and the output of the surrogate model is a set of properties, for example, the timing delay associated with various nets of the circuit, the leakage current of the circuit, and so on. According to an embodiment, the prediction is a normalized quality value corresponding to the measurement values of the timing delay, leakage current, etc. The system may use any normalization method, for example, physical programming. The quality value aggregated over multiple measurements represents the best possible quality of a sample. In an embodiment, the surrogate model predicts an objective value that is an aggregate value based on the various properties predicted by the surrogate model, for example, a weighted aggregate value based on the properties predicted by the surrogate model. In an embodiment, the surrogate model predicts the values of the properties for the circuit and the objective value is determined from the predicted property values. A surrogate model can also be configured to directly predict the objective values or the aggregated value. Executing the surrogate model to predicting the properties of the circuit design is computationally significantly more efficient compared to running a simulation. The system may perform simulations based on the circuit design to determine properties for different input parameters. The results of the simulation are used as training data for training the surrogate model. Accordingly, the surrogate model is trained for each circuit design being optimized. The goal of the optimization process is to find the parameters of the circuit design that minimize the objective value of the circuit design. The optimization module 130 performs the processes described herein for performing design parameter optimization.

A design process performs following steps. First, the designers design the circuit and optimize it in a typical corner, until all properties are satisfied. The typical corner often represents the mid-point in the target environment. Second, the optimized design is simulated over all the corners that represents extreme conditions of the environment. If the results failed to satisfy all the target properties at any of the corners, the designer will tune the circuit at those corners, for example, make changes to the circuit design by using different circuit components or change parameters of the circuit design. The tuned circuit design is verified again at all corners. This process is repeated until all properties are satisfied at all corners. Third, the design is verified with Monte Carlo simulations to check the possible yield. If yield is not satisfied, the design is further tuned, and the first/second step may be repeated. In a Monte Carlo simulation, simulations that reflect the variation in the different circuit elements are executed a number of times, and variation in the overall characteristics are evaluated.

In the above process, automatic design parameter optimization techniques disclosed herein are used to help optimize the design at a selected corner. Some techniques are built upon the surrogated model assisted optimization concept. Existing optimization frameworks fail to efficiently handle environment variations. Designer intervention may be used to select target corners and adjust design space when some of them failed the verification (i.e. above step 2). There are two possible improvements. First, all corners may be treated as one entity together and run the optimization algorithms on it. The drawback is that the resulting simulation time may easily become unreasonable considering that the number of corners may be several hundred and that Monte Carlo often needs multiple (e.g., 1000+) simulations for each. The second improvement is to add the verification and worst corner selection as the optimization's outer loop. Each time when the verification on all corners failed, the worst corner is selected to run the normal optimization algorithm which is often treated as an independent task. This is a viable direction, but simply selecting worst corners and separating out optimization for each corner may not provide best efficiency. The system according to various embodiments manages the optimization across environment variations more efficiently to reduce the simulations needed, thus reducing the turn around time and saving computing resources.

The system according to an embodiment uses a surrogate model to assist optimization process. The surrogate model helps evaluate the circuit design efficiently, thereby avoiding performing simulations on unpromising samples. The surrogate model is trained with simulation results across the environment variations along with the optimization process to correlate the behaviors across the environments together.

The application of this optimization framework targets at freeing circuit designers from the tedious optimization jobs, by searching for the optimal design by a single run without user intervention. The surrogate model tries to mimic a designer applying his/her intuition and knowledge in tuning the parameter values; the early dropping and coverage selection mimics a designer constantly monitoring the simulations to avoid unnecessary ones. This helps to allow the designers to focus their efforts on more valuable task like adjusting the circuit topology.

The system uses a set of measurements that are used to define the circuit behaviors and their target values. A designed circuit is considered good if all the target values are reached. Different measurements may need different testbenches.

Design parameters represent variables that the designers could adjust to improve the circuit behaviors. For example, a design parameter could be MOSFET length/width, resistor resistances, etc. A design parameter can be any variable that is in designers' control.

Free parameters are the variable that accounts for the self-adapting signals input to the designed circuit from external modulating modules that help the circuit to adapt to environment variations. A free parameter can take any value within a given range to help the circuit achieve the requirements.

A set of variables that describe an environment in which the circuit operates is referred to as a coverage. A coverage can be specified using one or more variables, e.g., temperature, driving voltage, a library used for circuit components, and so on. Monte Carlo is a type of coverage.

A testbench is a netlist that connects the designed circuit with driving and testing signals, together with corresponding measurement settings. This is the input to a simulator to evaluate the circuit behaviors.

Coverages are managed in levels since they are evaluated selectively to save simulation. Specifically for an optimization task involving multiple testbenches, multiple corners and Monte Carlo, coverage level 0 means all testbenches/corners/Monte Carlo samples are evaluated; coverage level 1 means all testbenches/corners but only selected Monte Carlo samples are evaluated; coverage level 2 means all testbenches with only selected corners and selected Monte Carlo samples are evaluated.

Figure 2A:
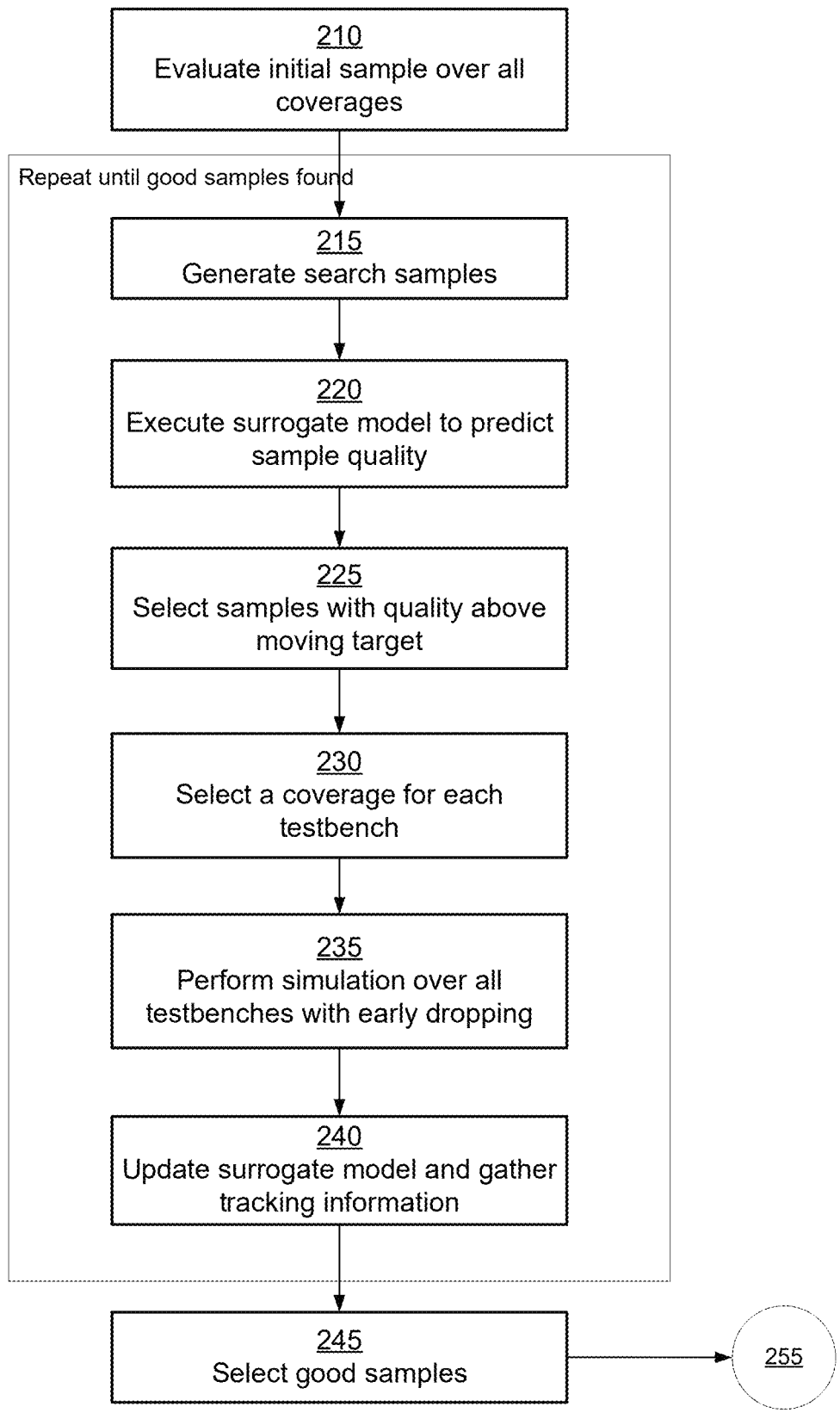
FIG. 2A-B show flowcharts illustrating the process for performing design parameter optimization for a circuit design according to an embodiment.
Figure 2B:
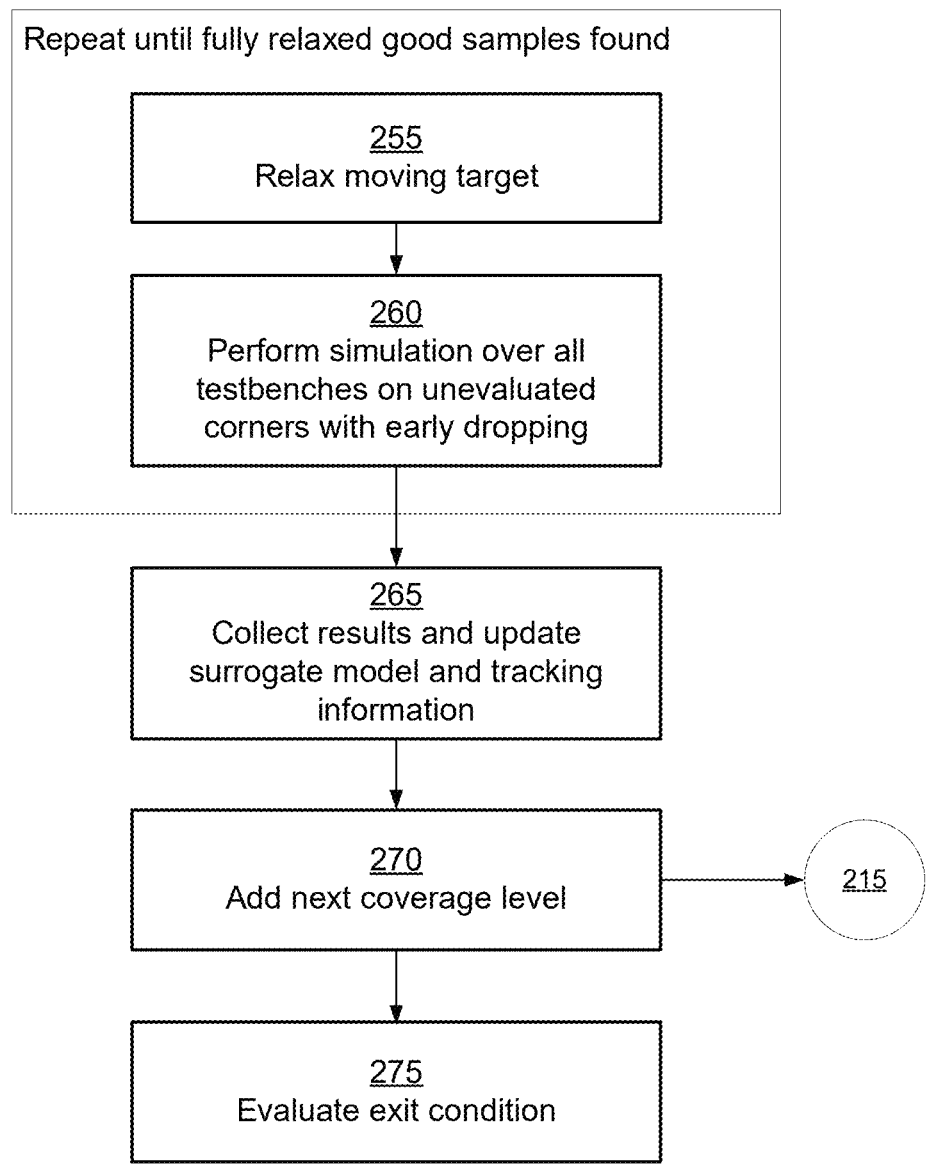

FIG. 2A-B show flowcharts illustrating the process for performing design parameter optimization for a circuit design according to an embodiment. The steps are indicated as being performed by a system, for example, the computing system of 110 shown in FIG. 1. The steps may be performed in an order different from that indicated in the flowchart.

In step 210, the system evaluates an initial sample over all coverages. The system may receive the initial sample from a user as an approximation of the solution. The system records the quality for each coverage independently for each testbench. This information is used for coverage selection in step 225. The system may receive an initial sample for step 215. Alternatively, the system may choose a nominal sample as the initial sample, for example, a sample that satisfies all properties under a typical environment, for example, room temperature and average values for various properties. Alternatively, the system may enter the optimization loop directly at step 230 by selecting coverages randomly for each testbench until some valid coverage quality ordering is obtained. The properties of a sample determined using simulation or surrogate models are also referred to as measurements based on the sample.

In step 215, the system may generate search samples by one or several possible techniques, for example, evolution based algorithms, random sampling, population base sampling, etc. or a combination of several such techniques. The system generates multiple search samples in step 215. The search samples may be derived from the initial sample based on above techniques. The search samples may be generated by a search engine.

In steps 220 and 225, the system filters the generated samples using a surrogate model. In step 220, the system executes the surrogate model to predict properties of the sample or determine a quality measure of each sample. Executing the surrogate model to predict the properties of the sample consumes time/resources usage that is negligible compares to simulations. In step 225, the system selects samples with quality measures above a threshold. In an embodiment, the simulation result is used to incrementally train this model as described in step 240. As a result, the predicted values represent the rough estimation of best possible quality of a sample.

Before a trained model is available at the first several iterations, the system may use random selection. However, after a few iterations, the surrogate model is trained using simulation data and subsequently is used instead of running simulations.

In step 230, the system reduces the number of simulations needed by selecting only one or several coverages for evaluation from each testbench. The system keeps a record of all coverage qualities independently for each testbench. The system selects coverage(s) according to a probability inversely proportional to the quality. Accordingly, the system selects worse corners with higher probability. This allows multiple coverages to be included across the optimization iterations to avoid prematurely focusing on a certain coverage. As every testbench/measurement may behave differently at each coverage, this selection is also independently done for each testbench/measurement. The number of coverages selected is a heuristic number that depends on testbench/measurement behaviors, which could simply be one, and should always be much smaller than the number of all coverages.

There are two policies regarding how the coverage quality records are updated, corresponding to whether it is done at step 240 or step 265. Updating the record at step 240 would help to mix coverage information to make a more balanced search at this partial coverage stage. But as the records for each coverage are from different samples, it may introduce additional noise to the search algorithm. Updating at step 265, on the other hand, delays the change until all coverages are evaluated, so the values are from the same sample, which makes it more stable but it also drops some ability of rebalancing coverages before the full simulation. The system receives from a user, for example, a developer, a configuration that determines the policy to use for updating the surrogate model at steps 240 and/or 265 or how the policies are combined. In some embodiments, the system automatically determines the policy to use for updating the surrogate model at steps 240 and/or 265. One possible starting point could be using step 240 update before the quality from step 265 is within a threshold of the moving target, after which step 265 update is used.

In steps 235 or 260, the simulations are run with "early dropping". Early dropping refers to an optimization in which a testbench is simulated at a certain coverage, the extracted measurement values is checked. If any of the measurement results in an objective quality worse than the moving target, the corresponding samples are dropped. All testbenches/coverages run afterward do not evaluate those samples. Accordingly, un-simulated testbenches/coverages of samples that have seen worse than moving target are skipped. For instance, assuming there are six samples {s1, s2, s3, s4, s5, s6}, and 5 testbenches, 10 corners each. A system without early dropping would simulate the six samples for all 5 testbenches and 10 corner combinations. However, the system implementing early dropping performs fewer simulations, for example, assuming that after simulating testbench T1 at coverage C1, {s2, s4} samples see results worse than the moving target. The system simulates fewer samples for the next testbench/corner, e.g., for testbench T2, and coverage C3, the system simulates only {s1, s3, s5, s6} samples and skips simulation of {s2, s4} samples. By properly managing the moving target, the simulation time saved is significant. In an embodiment, the system orders the testbenches by running fast testbenches first, which helps filter out bad samples for more expensive testbenches.

In steps 240 and 265, the system performs simulation data analysis and updates the surrogate model, the moving target, and the coverage qualities are updated at these steps. Coverage quality is an indication of how the sample qualities compare over different coverage. For example, for a certain testbench and a sample, the system gets a quality value of 9 at coverage c1, and a quality value of 7 at coverage c2 (where smaller quality value represents better quality). The system determines that quality of coverage c2 is better than quality of coverage c1, i.e., c2 has a better "coverage quality". In coverage selection, c1 has a higher probability of being selected The system characterizes search samples by their objective values, which are the translated measurement results according to a normalization method (e.g., physical programming). For example, the system may determine an objective for each sample such that smaller objective value corresponds to a better quality. Accordingly, the system performs optimization by minimizing the objective values.

The system may use either a single surrogate model that works on an aggregate objective value (also referred to as the lumped objective value) or multiple surrogate models one for each property or measurement that is predicted. The aggregate objective for a sample may be determined by taking the maximum objective values corresponding to each property/measurement, or the average over the evaluated properties/measurements. By feeding such aggregate objective values to the surrogate model, the model's prediction indicates the best possible objective quality for a given sample.

The system determines a moving target that determines threshold objectives or measurements that are constantly updated. In an embodiment, the system determines the moving target as the value of the worst objective of the $N^{th}$ best sample ever evaluated. The number N is a heuristic value to be determined by the developer (not the circuit designer, although it could be opened to the user as an option). For example, N approximately equal to 100 is a reasonable starting point. As the optimization iteration progresses and the sample quality improves, samples with relatively bad qualities may no longer help the search process and the simulation of those samples is skipped to avoid wasting time/resources. The system maintains a moving target to help avoid such simulations.

At step 245, the system verifies the chosen samples by evaluating all coverages at next level. If the previous search has found some samples that satisfied all the requirements based on the evaluated objectives, the system selects these as good samples and the coverages for these samples that are not yet evaluated are verified at step 260. Alternatively, if the search has not seen any improvement over a number of iterations, the system is forced to move to the next level to continue. In this situation, the chosen samples will be the best N number of samples found so far, where N is a positive integer.

In step 255, since the coverage level is only evaluated occasionally, the results are used to help correct the objective landscape that the surrogate model learns. The objective landscape represents how the objective varies in the parameter space. For example, if there are two parameters, the landscape is similar to a topology map and the goal of the optimization process is to find the basin in the topology map. So, the moving target is relaxed to promote such corrections. The moving target may be relaxed by increasing the value of the moving target by a percentage value, for example, 20%. Accordingly, if the original moving target value is 100, the relaxed moving target value becomes 120. Over iterations, the moving target is 'tightened' gradually. But when the system tries to fill in the skipped coverages, (i.e. moving from the process in FIG. 2B to the process in FIG. 2C while performing steps 235 or 260), then moving target is relaxed. The relaxation may be performed gradually to avoid simulating poor quality corners. This may cause repetition of the steps 255 and 260. The system may set an absolute bound for the moving target to the worst objective value of the best sample that has evaluated all the coverages at this level.

In step 270, since the coverages could be divided into multiple levels (e.g., full corner+partial Monte Carlo, full corner+full Monte Carlo, and so on), steps 245, 255, 260, 265 are repeated for the next coverage level. When more good samples need to be found, or the sample qualities are to be further improved, the system goes back to step 215 and repeats the searching of samples with all the previous simulated results known to the search engine until all coverage levels are completed.

The exit condition in step 275 may be reached if enough good samples are found, or if convergence is reached. The convergence criteria may be that the improvement in subsequent iterations is below a threshold value. Various embodiments can use different convergence criteria. At step 245, the sample selection rule may be different depending on the exit condition (step 275), i.e., whether the exit condition is based on selection of good samples, or the exit condition is based on convergence.

Figure 2C:
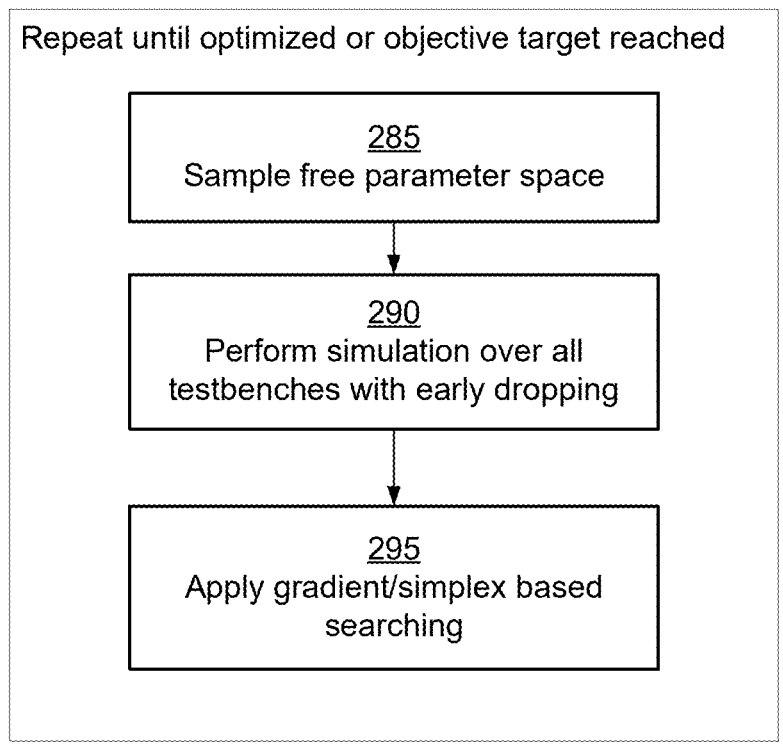
FIG. 2C illustrates the details of steps for handling circuits with self-adaptive modulation signals according to an embodiment.

FIG. 2C illustrates the details of steps for handling circuits with self-adaptive modulation signals according to an embodiment. The automatic modulating signal that helps the designed circuit to adapt to the changing environment is modeled with a set of free parameters varying within the given ranges. The modulating process is simulated by an optimization loop shown in FIG. 2C. This optimization loop finds the free parameter set that makes the circuit achieve the best objective qualities in a given coverage. In step 285, the system samples free parameter space. In step 290, the system performs simulation over all testbenches with early dropping. In step 295, the system performs a gradient or simplex based searching for the optimal sample. This mimics the modulation that adjusts the circuit to its best working condition in the environment. The optimization loop is kept simple, as normally for a feedback modulation, the circuit behavior would be a smooth function with respect to the input signal and the signal space is often limited. This optimization block is executed in step 235 or 260 from the overall optimization framework. In addition, the optimized free parameter set is be recorded for each coverage to enable an efficient start for later iterations.

This flow is demonstrated by optimizing an amplifier circuit (input configuration file is attached). The circuit is characterized by 5 testbenches with 9 properties/measurements including gain, phase margin, unit gain frequency, noise level, etc. and 8 corners for each testbench.

Figure 3:
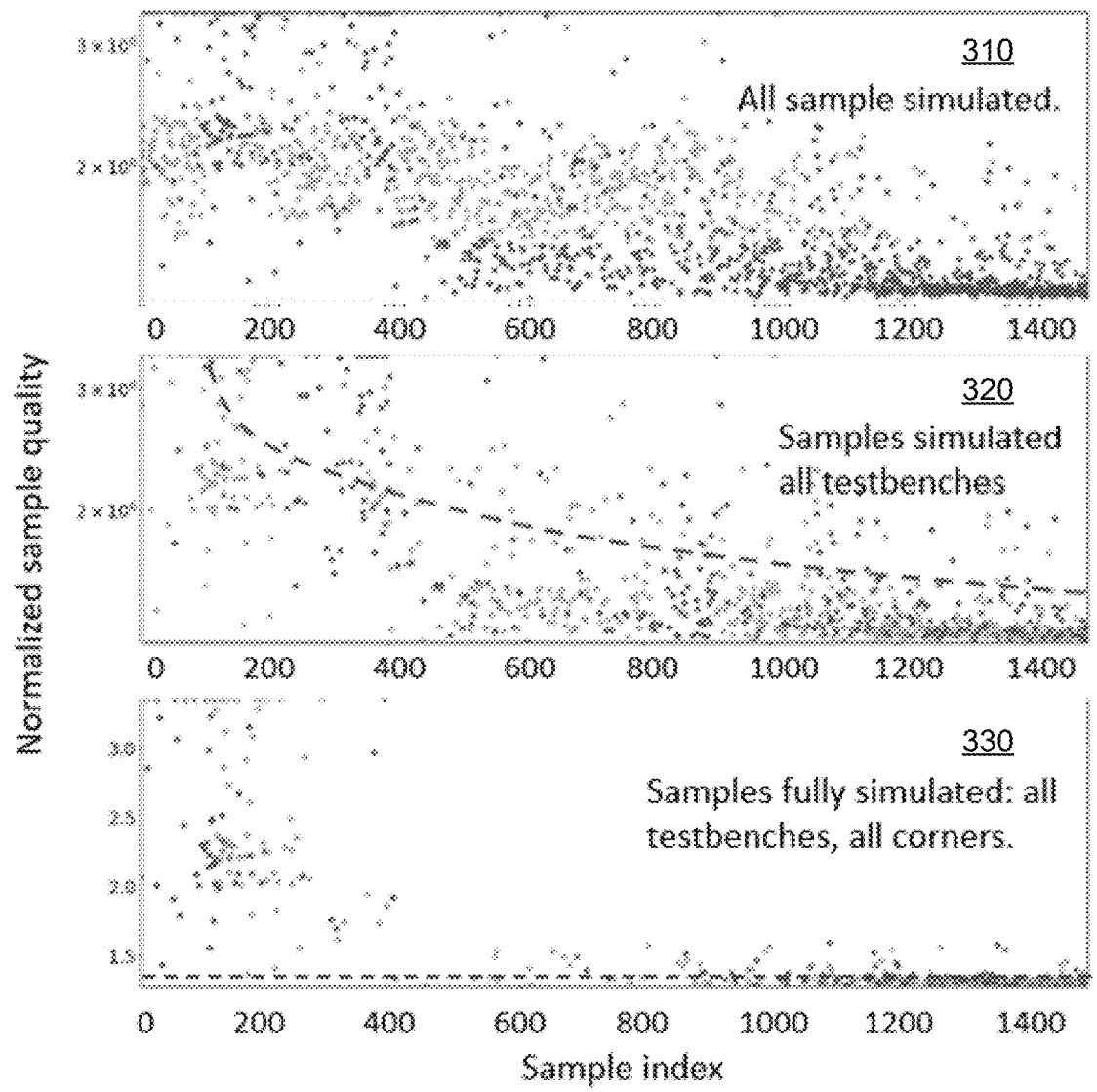
FIG. 3 shows experimental results illustrating performance of the system according to an embodiment.

FIG. 3 shows experimental results illustrating performance of the system according to an embodiment. As illustrated in chart 310, approximately 1500 search samples were simulated. Due to early dropping, only a portion of them were simulated across all the testbenches as shown in chart 320. The dashed line in chart 320 indicates the progress of the moving target for early dropping. The moving target starts with a very relaxed value and is tightened as more better samples are evaluated. An even smaller portion of the samples have simulated all corners as shown in chart 330, because only samples that are considered good at selected coverage stage are promoted to verify all corners. This example includes corner coverages. If Monte Carlo is added, the system shows another level of sample reduction beyond that shown in chart 330 as a result of adding full Monte Carlo simulations.

Figure 4:
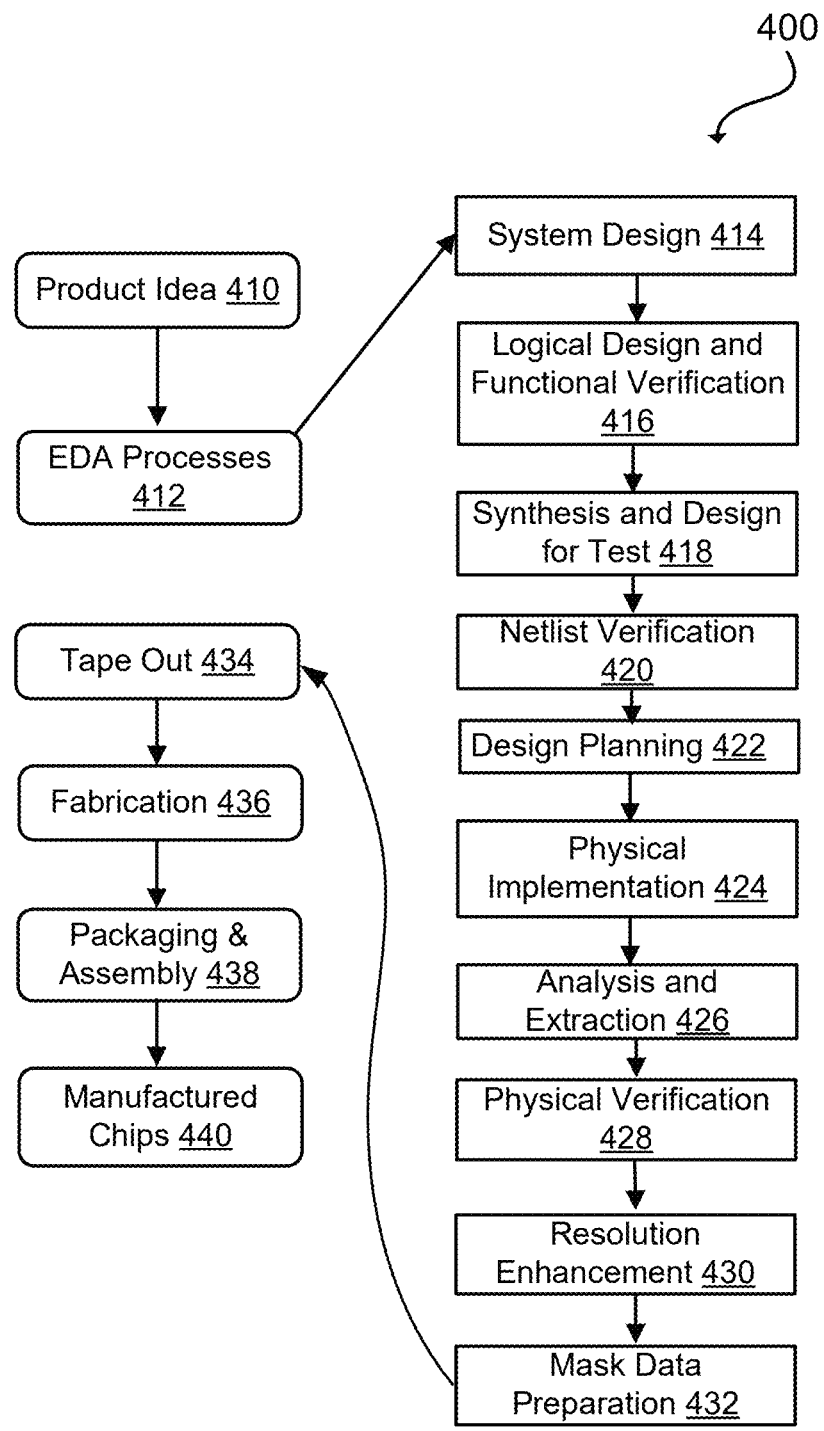
FIG. 4 depicts a flowchart of various processes used during the design and manufacture of an integrated circuit in accordance with some embodiments of the present disclosure.

FIG. 4 illustrates an example set of processes 400 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 410 with information supplied by a designer, information which is transformed to create an article of manufacture that uses a set of EDA processes 412. When the design is finalized, the design is taped-out 434, which is when artwork (e.g., geometric patterns) for the integrated circuit is sent to a fabrication facility to manufacture the mask set, which is then used to manufacture the integrated circuit. After tape-out, a semiconductor die is fabricated 436 and packaging and assembly processes 438 are performed to produce the finished integrated circuit 440.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a less generic description adds more useful detail into the design description, for example, more details for the modules that include the description. The lower levels of representation that are less generic descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 4. The processes described by be enabled by EDA products (or tools).

During system design 414, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 416, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 418, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 420, the netlist is checked for compliance with timing constraints and for correspondence with the HDL code. During design planning 422, an overall floor plan for the integrated circuit is constructed and analyzed for timing and top-level routing.

During layout or physical implementation 424, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 426, the circuit function is verified at the layout level, which permits refinement of the layout design. During physical verification 428, the layout design is checked to ensure that manufacturing constraints are correct, such as DRC constraints, electrical constraints, lithographic constraints, and that circuitry function matches the HDL design specification. During resolution enhancement 430, the geometry of the layout is transformed to improve how the circuit design is manufactured.

During tape-out, data is created to be used (after lithographic enhancements are applied if appropriate) for production of lithography masks. During mask data preparation 432, the 'tape-out' data is used to produce lithography masks that are used to produce finished integrated circuits.

A storage subsystem of a computer system may be used to store the programs and data structures that are used by some or all of the EDA products described herein, and products used for development of cells for the library and for physical and logical design that use the library.

Figure 5:
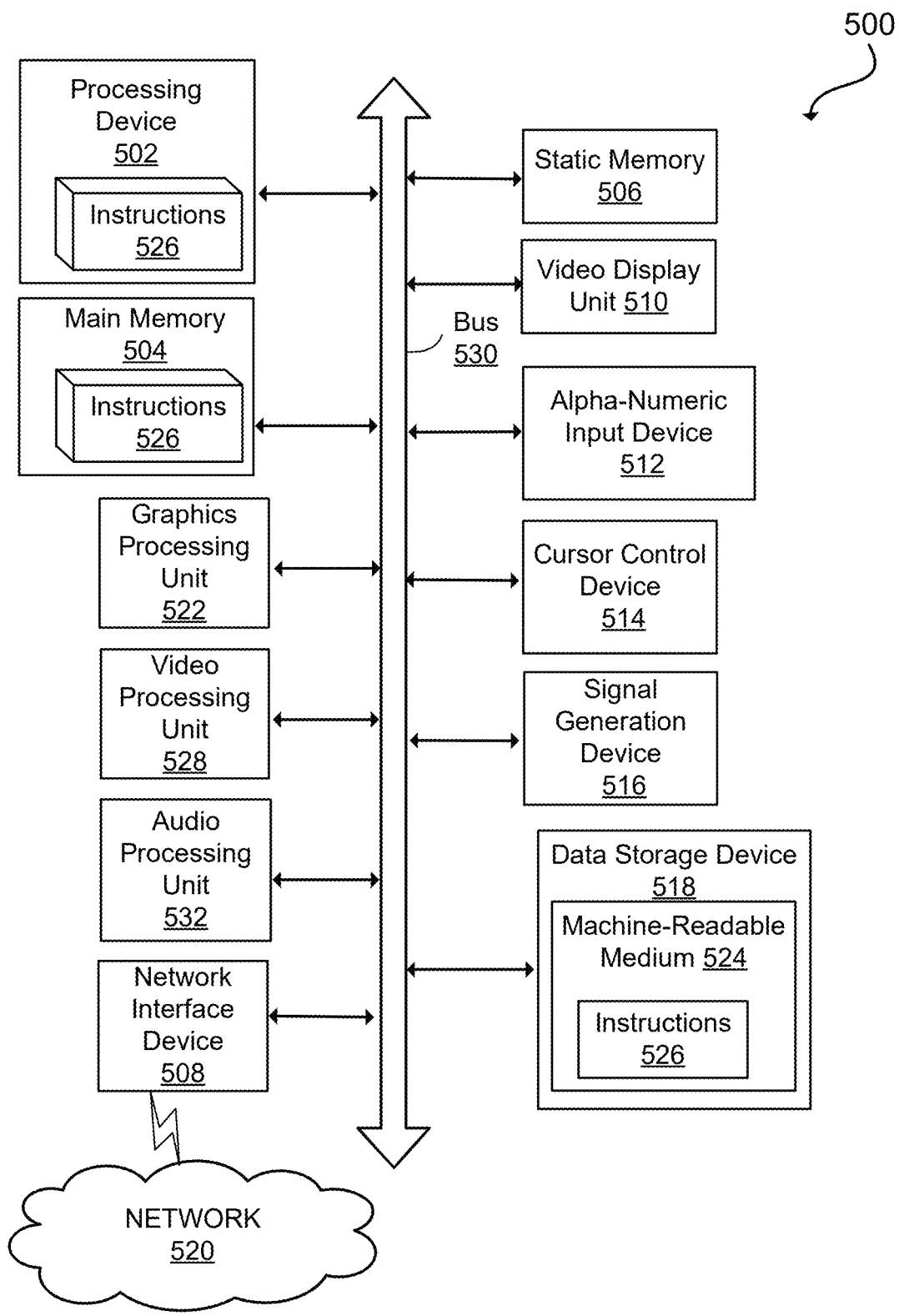
FIG. 5 depicts a diagram of an example computer system in which embodiments of the present disclosure may operate.

FIG. 5 illustrates an example machine of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM), a static memory 506 (e.g., flash memory, static random access memory (SRAM), etc.), and a data storage device 518, which communicate with each other via a bus 530.

Processing device 502 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 may be configured to execute instructions 526 for performing the operations and steps described herein.

The computer system 500 may further include a network interface device 508 to communicate over the network 520. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), a graphics processing unit 522, a signal generation device 516 (e.g., a speaker), graphics processing unit 522, video processing unit 528, and audio processing unit 532.

The data storage device 518 may include a machine-readable storage medium 524 (also known as a non-transitory computer-readable medium) on which is stored one or more sets of instructions 526 or software embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting machine-readable storage media.

In some implementations, the instructions 526 include instructions to implement functionality corresponding to the present disclosure. While the machine-readable storage medium 524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 502 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method for optimizing parameters of a circuit design, the method comprising:
   receiving a circuit design;
   accessing a model configured to receive design variables of the circuit design and predict a quality of the circuit design;
   for each of a plurality of coverages, performing:
      generating a set of samples for the coverage, each sample representing a set of values of design parameters;
      for each sample from the set of samples, predicting the quality of the sample using the model;
      selecting a subset of samples determined to have a predicted quality that exceeds a target;
      performing simulations of the selected subset of samples; and
      performing incremental training of the model based on results of the simulations of the selected subset of samples; and
   selecting one or more samples based on results of the simulations.

2. The method of claim 1, further comprising:
   performing initial training of the model by generating a set of samples based on different values of design parameters and quality metrics of the circuit design determined based on simulations.

3. The method of claim 1, further comprising:
   maintaining a moving target of quality of samples;
   relaxing the moving target while evaluating the samples for one or more coverages.

4. The method of claim 3, further comprising:
   performing early dropping of samples, comprising, responsive to a sample indicating a quality worse than the moving target for a testbench and a coverage, skipping simulations of the sample for one or more other testbenches and groups.

5. The method of claim 1, wherein the predicting a quality of the circuit design comprises predicting one or more properties of the circuit design and determining the predicted quality as an aggregate of the properties of the circuit design.

6. The method of claim 5, wherein a predicted property of the circuit design is a value based on one or more of:
   a timing delay of the circuit design; and
   a leakage current of the circuit design.

7. The method of claim 1, further comprising:
   for each of the plurality of coverages, further performing:
      evaluating the circuit design for a plurality of testbenches, wherein a testbench comprises a set of driving signals and testing signals for the circuit design.

8. The method of claim 7, wherein evaluating the circuit design for the plurality of testbenches comprises, responsive to determining that a sample has below threshold quality for a particular testbench, skipping the evaluation of remaining testbenches of the plurality of testbenches.

9. A non-transitory computer readable medium comprising stored instructions, which when executed by a computer processor, cause the computer processor to:
   receive a circuit design;
   access a model configured to receive design variables of the circuit design and predict a quality of the circuit design;
   for each of a plurality of coverages, perform:
      generate a set of samples for the coverage, each sample representing a set of values of design parameters;
      for each sample from the set of samples, predict the quality of the sample using the model;
      select a subset of samples determined to have a predicted quality that exceeds a target;
      perform simulations of the selected subset of samples; and
      perform incremental training of the model based on results of the simulations of the selected subset of samples; and
   select one or more samples based on results of the simulations.

10. The non-transitory computer readable medium of claim 9, wherein the instructions further cause the computer processor to:
    perform initial training of the model by generating a set of samples based on different values of design parameters and quality metrics of the circuit design determined based on simulations.

11. The non-transitory computer readable medium of claim 9, wherein the instructions further cause the computer processor to:
    maintain a moving target of quality of samples;
    relax the moving target while evaluating the samples for one or more coverages.

12. The non-transitory computer readable medium of claim 11, wherein the instructions further cause the computer processor to:
    perform early dropping of samples, comprising, responsive to a sample from a group of samples indicating a quality below the moving target for a testbench and a coverage, skipping simulations of the sample for one or more other testbenches and groups.

13. The non-transitory computer readable medium of claim 9, wherein the predicting a quality of the circuit design comprises predicting one or more properties of the circuit design and determining the predicted quality as an aggregate of the properties of the circuit design.

14. The non-transitory computer readable medium of claim 13, wherein a predicted property of the circuit design is a value based on one or more of:
    a timing delay of the circuit design; and
    a leakage current of the circuit design.

15. The non-transitory computer readable medium of claim 9, wherein the instructions further cause the computer processor to:
    for each of the plurality of coverages, evaluate the circuit design for a plurality of testbenches, wherein a testbench comprises a set of driving signals and testing signals for the circuit design.

16. The non-transitory computer readable medium of claim 15, wherein evaluating the circuit design for the plurality of testbenches comprises, responsive to determining that a sample has below threshold quality for a particular testbench, skipping the evaluation of remaining testbenches of the plurality of testbenches.

17. A system comprising:
    a memory storing instructions; and
    a processor, coupled with the memory and to execute the instructions, the instructions when executed cause the processor to;

receive requirements for a circuit design;
access a model configured to receive design variables of the circuit design and predict a quality of the circuit design;
for each of a plurality of coverages, perform:
    generate a set of samples for the coverage, each sample representing a set of values of design parameters;
    for each sample from the set of samples, predict the quality of the sample using the model;
    select a subset of samples determined to have a predicted quality that exceeds a target;
    perform simulations of the selected subset of samples; and
    perform incremental training of the model based on results of the simulations of the selected subset of samples; and
select one or more samples based on results of the simulations.

18. The system of claim 17, wherein the instructions further cause the computer processor to:
    perform initial training of the model by generating a set of samples based on different values of design parameters and quality metrics of the circuit design determined based on simulations.

19. The system of claim 17, wherein the instructions further cause the computer processor to:
    maintain a moving target of quality of samples;
    relax the moving target while evaluating the samples for one or more coverages.

20. The system of claim 19, wherein the instructions further cause the computer processor to:
    perform early dropping of samples, comprising, responsive to a sample from a group of samples indicating a quality below the moving target for a testbench and a coverage, skipping simulations of the sample for one or more other testbenches and groups.

\* \* \* \* \*